US012586841B2

(12) United States Patent
George et al.

(10) Patent No.: US 12,586,841 B2
(45) Date of Patent: Mar. 24, 2026

(54) BATTERY MODULE COOLANT CHANNELS

(71) Applicant: McLaren Automotive Limited,
Woking (GB)

(72) Inventors: Sunoj Cherian George, Woking (GB);
James Douglas McLaggan, Woking
(GB); Elie Talj, Woking (GB)

(73) Assignee: McLaren Automotive Limited,
Woking (GB)

( * ) Notice: Subject to any disclaimer, the term of this
patent is extended or adjusted under 35
U.S.C. 154(b) by 856 days.

(21) Appl. No.: 17/277,252

(22) PCT Filed: Sep. 17, 2019

(86) PCT No.: PCT/GB2019/052608
§ 371 (c)(1),
(2) Date: Mar. 17, 2021

(87) PCT Pub. No.: WO2020/058695
PCT Pub. Date: Mar. 26, 2020

(65) Prior Publication Data
US 2022/0052396 A1     Feb. 17, 2022

(30) Foreign Application Priority Data

Sep. 18, 2018     (GB) ...................................... 1815186

(51) Int. Cl.
*H01M 10/6568*          (2014.01)
*H01M 10/613*          (2014.01)
(Continued)

(52) U.S. Cl.
CPC ..... *H01M 10/6568* (2015.04); *H01M 10/613*
(2015.04); *H01M 10/625* (2015.04); *H01M*
*10/643* (2015.04); *H01M 2220/20* (2013.01)

(58) Field of Classification Search
CPC ........... H01M 10/6568; H01M 10/613; H01M
10/625; H01M 10/643; H01M 2220/20
See application file for complete search history.

(56) References Cited

U.S. PATENT DOCUMENTS

2007/0087266 A1     4/2007  Bourke et al.
2010/0279153 A1*  11/2010  Payne ............... H01M 10/6567
429/50
(Continued)

FOREIGN PATENT DOCUMENTS

CN          105846009 A     8/2016
CN          205900748 U     1/2017
(Continued)

OTHER PUBLICATIONS

GB Examination Report issued in GB Application No. GB1815186.
0, dated Jul. 4, 2022. 5 pages.
(Continued)

*Primary Examiner* — Nicole M. Buie-Hatcher
*Assistant Examiner* — Taylor Harrison Krone
(74) *Attorney, Agent, or Firm* — Mintz Levin Cohn Ferris
Glovsky and Popeo, P.C.

(57)          ABSTRACT

A battery comprising a plurality of battery modules arranged
in a row, each battery module comprising a plurality of cells
and a housing enclosing the plurality of cells. The battery
further comprising a supply coolant conduit and a drain
coolant conduit, each adjoining and extending along at least
part of the row of battery modules, the supply coolant
conduit being configured to supply coolant to multiple ones
of the battery modules and the drain coolant conduit being
configured to drain coolant from multiple ones of the battery
modules.

17 Claims, 6 Drawing Sheets

(51) Int. Cl.
 *H01M 10/625* (2014.01)
 *H01M 10/643* (2014.01)

(56) References Cited

U.S. PATENT DOCUMENTS

| | | | |
|---|---|---|---|
| 2011/0033742 A1 | 2/2011 | Maier et al. | |
| 2011/0212355 A1* | 9/2011 | Essinger | H01M 10/6555 |
| | | | 429/120 |
| 2011/0269008 A1* | 11/2011 | Houchin-Miller | |
| | | | H01M 10/6567 |
| | | | 429/120 |
| 2016/0172727 A1 | 6/2016 | Chan et al. | |
| 2017/0005381 A1* | 1/2017 | Harris | H01M 50/581 |
| 2017/0005384 A1 | 1/2017 | Harris et al. | |
| 2017/0125858 A1 | 5/2017 | Miller et al. | |
| 2017/0279172 A1* | 9/2017 | Tucker | H01M 50/249 |
| 2019/0148681 A1* | 5/2019 | Park | H01M 50/289 |
| | | | 429/120 |
| 2020/0398652 A1* | 12/2020 | Stephens | B62D 25/025 |

FOREIGN PATENT DOCUMENTS

| | | | | |
|---|---|---|---|---|
| CN | 206180049 U | 5/2017 | | |
| CN | 207818838 U | 9/2018 | | |
| DE | 102016001145 A1 * | 8/2017 | | H01M 10/613 |
| EP | 2 469 640 A2 | 6/2012 | | |
| EP | 2 899 796 A1 | 7/2015 | | |
| KR | 2017 0121555 A | 11/2017 | | |
| WO | WO-2010/056750 A2 | 5/2010 | | |
| WO | WO-2020/058695 A1 | 3/2020 | | |

OTHER PUBLICATIONS

GB Search Report issued in GB Application No. GB1815186.0, date of search Jan. 21, 2019. 5 pages.

International Search Report and Written Opinion issued in International Application No. PCT/GB2019/052608, mailed Nov. 20, 2019 (Nov. 20, 2019). 13 pages.

* cited by examiner

BATTERY MODULE COOLANT CHANNELS

This invention relates to a battery to be installed in a vehicle, in particular the means by which the battery temperature is regulated.

An increasing number of vehicles are being manufactured, wherein the vehicle uses electric energy from a battery installed in the vehicle as an energy source. The vehicle could be an electric vehicle or a hybrid vehicle. Vehicles may be domestic vehicles or high power, lightweight vehicles such as supercars.

Thus, it is desirable to manufacture a battery configurable to be installed in vehicles of all dimension and shapes.

For this reason, a battery of a modular design is beneficial in that battery modules can be arranged in a variety of configurations to enable the battery to fit into cavities of different dimensions and shapes. Hence the same manufactured parts can be used in a wide range of applications.

Battery cells generate heat when supplying energy. For the battery to function efficiently and for long periods of time, the temperature of battery cells must be regulated during operation. A method of cooling used among existing vehicle batteries is the use of coolant fluid to regulate the temperature of the cells of the battery. It is known for the battery to comprise conduits through which coolant fluid can propagate, the conduits being located adjacent to the battery cells. Such arrangements however typically use multiple pipes, often one for each inlet and outlet flow leading to considerable material usage in the pipework. Given the general desire to minimise weight and space used by batteries in a vehicle, this type of coolant supply therefore requires a complex network of pipes which takes up a relatively large volume and contributes to additional unwanted weight.

According to the present invention there is provided a battery comprising a plurality of battery modules, each battery module comprising a cell tray holding cells. Each battery module further comprising a housing enclosing one or more regions containing cells.

The housing further defining two apertures, an inlet and outlet. The battery comprising an inlet and an outlet for each battery module. Two coolant conduit portions adjoin each battery module. The coolant conduit portions can be said to be modular elements of coolant conduits.

One coolant conduit portion is a supply coolant conduit portion, configured to supply coolant to the adjoined battery module through the inlet. When two or more battery modules are arranged in a row, supply coolant conduit portions adjoined to neighbouring battery modules align with one another. Supply coolant conduit portions adjoined to neighbouring battery modules can be connected to one another with couplers. Couplers form liquid tight connections between supply coolant conduit portions. The connected supply coolant conduit portions and couplers form a supply coolant conduit which extends along the length of the row of battery modules.

One coolant conduit portion is a drain coolant conduit portion, configured to drain coolant from the adjoined battery module through the outlet. When two or more battery modules are arranged in a row, drain coolant conduit portions adjoined to neighbouring battery modules align with one another. Drain coolant conduit portions adjoined to neighbouring battery modules can be connected to one another with couplers. Couplers form liquid tight connections between drain coolant conduit portions. The connected drain coolant conduit portions and couplers form a drain coolant conduit which extends along the length of the row of battery modules.

The battery may be configured to functionally interact with a heat exchanger for extracting thermal energy from the coolant. A battery may be configured so that coolant drained by the drain coolant conduit from any of the ones of the battery modules is acted upon by the heat exchanger prior to being supplied any other battery module by the supply coolant conduit.

The battery modules comprising coolant conduit portions can be arranged in multiple different configurations so that the battery modules can be installed in vehicle cavities of varying shapes and sizes. The modular nature of the coolant conduits has the advantage of ensuring that the temperature of the battery cells can be regulated, whatever the arrangement of the battery modules

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

Figure 1:
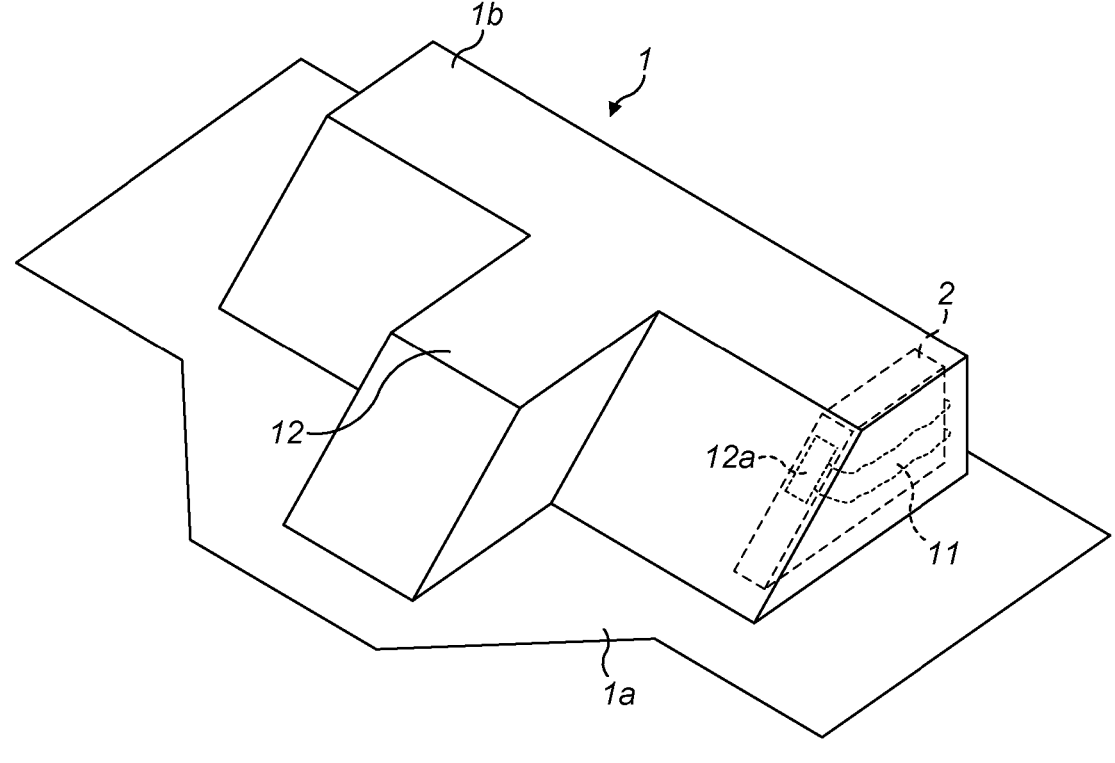
FIG. 1 shows a battery.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.
Battery Overview FIG. 1 shows a battery 1 which may comprise a number of identical battery modules 2. The battery modules may be arranged in a row. The battery may comprise any number of battery modules 2. In the example depicted in FIG. 1, one battery module 2 is shown for clarity, but in a preferred example there may be thirteen modules.

The battery may be installed in a vehicle. FIG. 1 shows the battery 1 fixed to a battery floor 1*a*. The battery floor 1*a* may be structurally integral to the vehicle in which the battery is installed. For example, the battery floor may be a load bearing component of a vehicle chassis. The battery floor 1*a* may be configured to be removably fitted to the vehicle so that the battery 1 can be removed from the vehicle. For example, for maintenance or replacement of the battery 1.

The battery 1 may further comprise a battery control unit 12 which protrudes from the row of battery modules. The battery control unit 12 may be electrically connected to one or more module control units 12*a*. Each battery module 2 may comprise an attached module control unit 12a. The battery control unit 12 may control each battery module control unit 12a. Each battery module control unit 12a may control the activity of the respective attached battery module. Each battery module control unit 12a may receive information concerning the operation of the respective attached battery module. The battery module control units 12a may process that information and feed that information to battery control unit 12.

The battery modules and battery control unit 12 may be enclosed by the battery floor 1a and a battery housing 1b.

Figure 2:
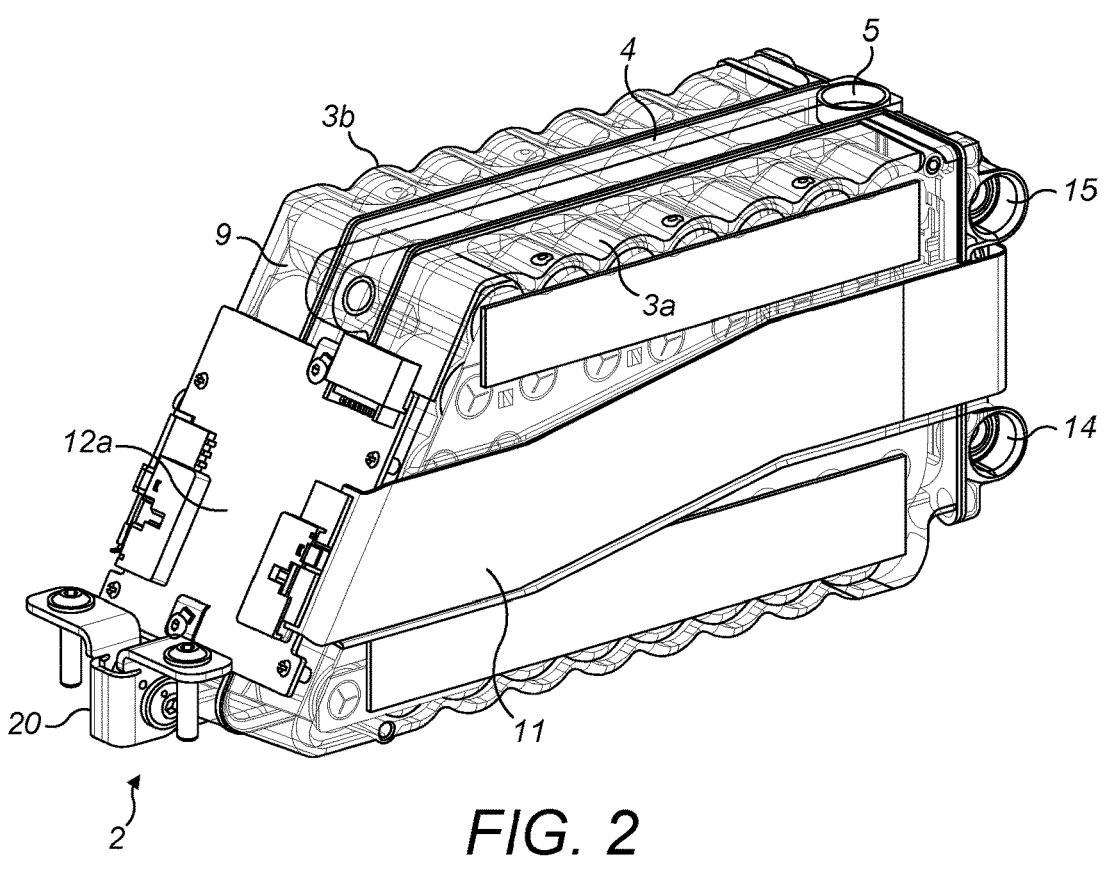
FIG. 2 shows a battery module from the front.

FIG. 2 shows a battery module 2 with a trapezoidal prism shape. The battery module depicted in FIG. 2 comprises a cell tray 4 and a two-part housing 3a, 3b. In FIG. 2, the battery module 2 and the cell tray 4 share a common longitudinal axis.

Cell Tray

Figure 4:
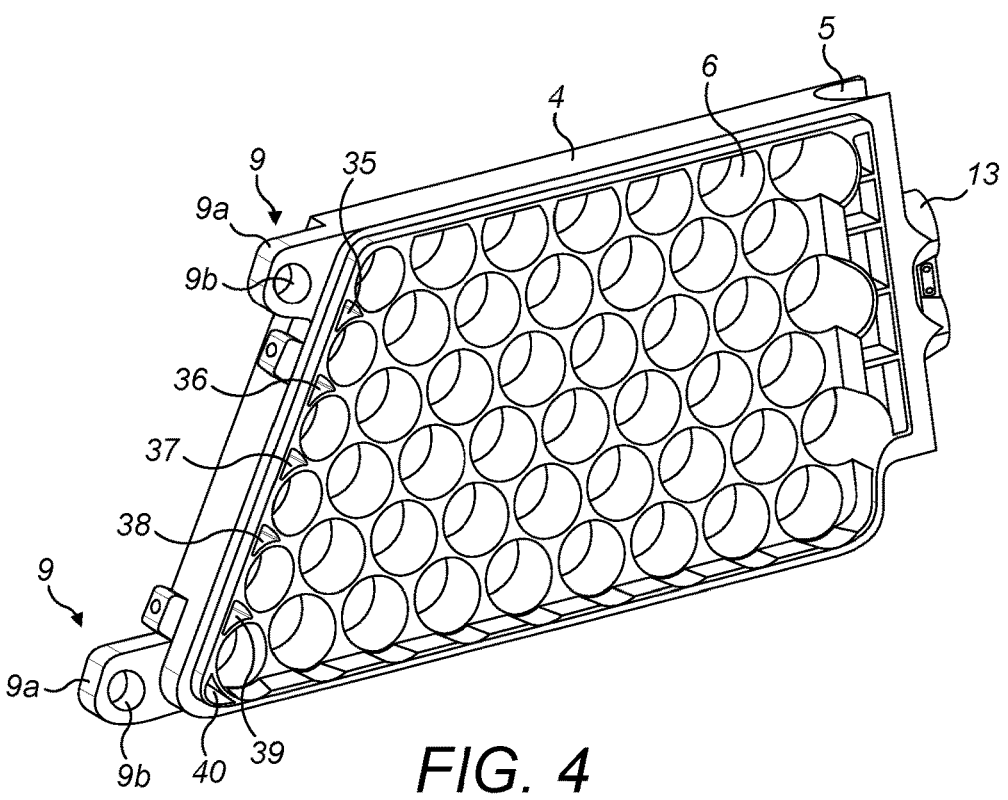
FIG. 4 shows a cell tray.

An exemplary cell tray 4 is shown in FIG. 4. The cell tray depicted in FIG. 4 comprises cell holes 6 for holding cells (not shown). Each cell hole 6 may extend through the cell tray in a direction perpendicular to the longitudinal axis of the cell tray. The cell tray may be formed of electrically insulating material.

The cell tray may further comprise a fixing hole 5 configured to receive a fixing element (not shown) for securing the cell tray 4, and hence the battery module 2, to the battery floor (not shown).

FIG. 4 shows the cell tray 4 comprising two fixings 9, each fixing comprising a tab 9a, the tab forming a connection hole 9b. Both fixings are generally positioned in the same plane as the cell tray. Each connection hole 9b may extend through its respective tab 9a in a direction parallel to the direction in which the cell holes 6 extend through the cell tray 4. The cell tray may comprise more than two fixings. The cell tray may comprise a single fixing. Fixings on multiple battery modules may receive one or more common elements so that the battery modules can be secured to one another.

Figure 5:
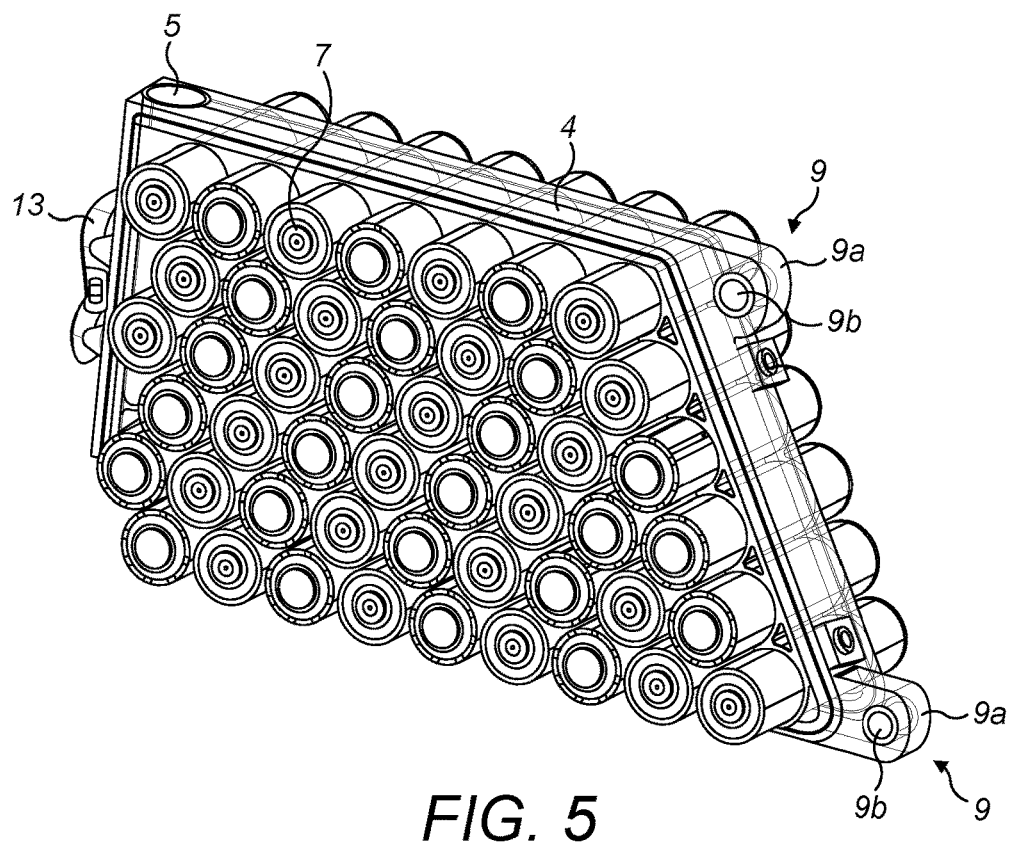
FIG. 5 shows a cell tray holding cells.

FIG. 5 shows a number of cells 7 being held in the cell holes 6 of the cell tray 4. The cell tray may be configured to hold any number of cells. In the example depicted in FIG. 5 there are forty-eight cells held in respective cell holes 6. Each cell hole may hold one cell.

Resin may be poured into a recessed side of the cell tray. The resin may harden around cells placed in the cell tray so as to secure the cells in the cell tray. Alternatively, each cell 7 may be held in a cell hole 6 by an interference fit between the cell tray 4 surrounding the cell hole and the cell inserted into the respective cell hole.

Each cell hole may extend through the cell tray in a direction perpendicular to the longitudinal axis of the cell tray. In the example cell tray depicted in FIGS. 4 and 5, each cell hole is cylindrical so as to accommodate cylindrical cells. In other examples, each cell hole may be prismatic so as to accommodate prismatic cells.

The length of each cell may be greater than the length of each cell hole. Each cell 7 comprises a positive terminal and negative terminal. When a cell 7 is inserted into a cell hole 6, a length of the cell 7 comprising the positive terminal of the cell may protrude from the cell hole on one side of the cell tray 4 whilst a length of the cell 7 comprising the negative terminal protrudes from the cell hole on the other side of the cell tray. The portion of the cell 7 comprising the positive terminal and the portion of the cell 7 comprising the negative terminal may protrude from opposite sides of the cell tray. The protruding length of the portion of the cell comprising the cell's positive terminal and the protruding length of the portion of the cell comprising the cell's negative terminal may be equal.

Figure 3:
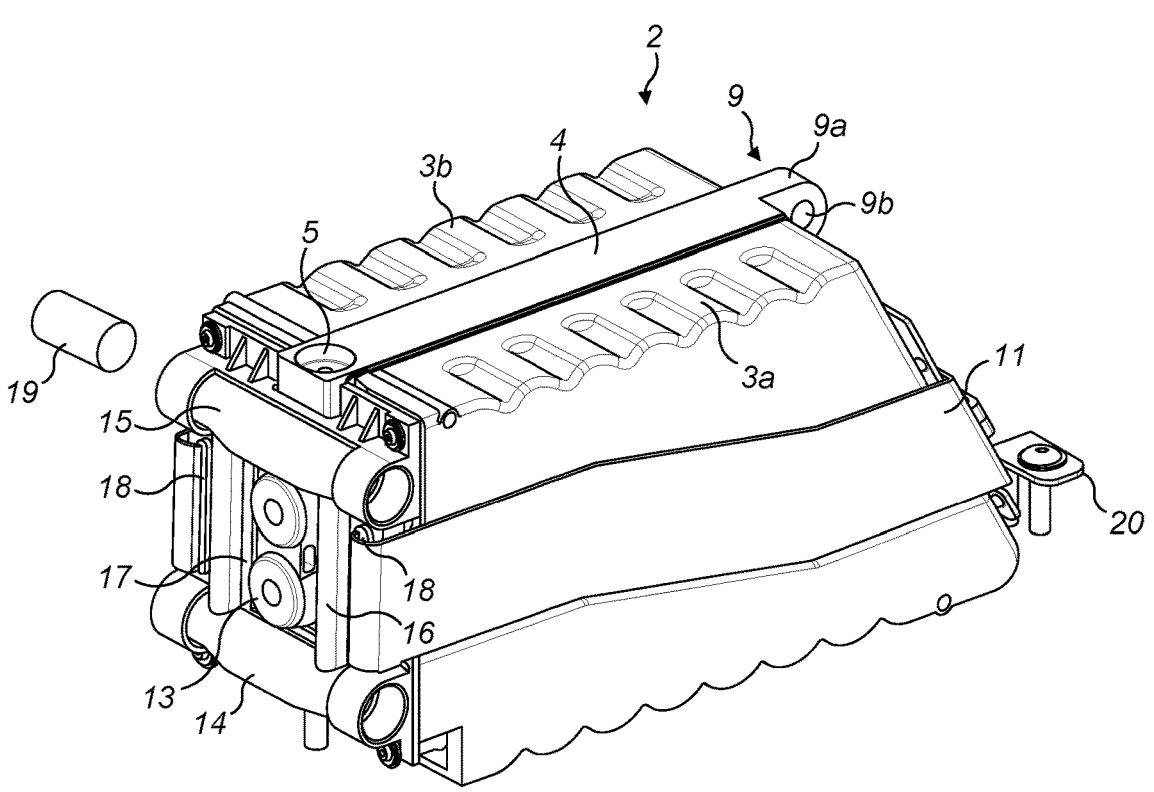
FIG. 3 shows a battery module from the back.

The battery module 2 shown in FIG. 2 comprises a two-part module housing 3a, 3b. The housing 3a, 3b may form two enclosed regions which contain the cells 7 held in the cell tray 4. In FIG. 2, one part of the module housing 3a encloses the portions of cells protruding on one side of the cell tray. The second part of the module housing 3b encloses the portions of the cells protruding on the opposite side of the cell tray. In FIGS. 2 and 3, the exterior faces of the battery module 2 comprise faces of the cell tray 4 and the housing 3a, 3b. Alternatively, the housing 3a, 3b may enclose the entirety of the cell tray. In this case, the exterior faces of the battery module would comprise faces of the housing 3a, 3b.

Cell to Cell Busbars and Flexible Printed Circuit Board

Figures 6, 7:
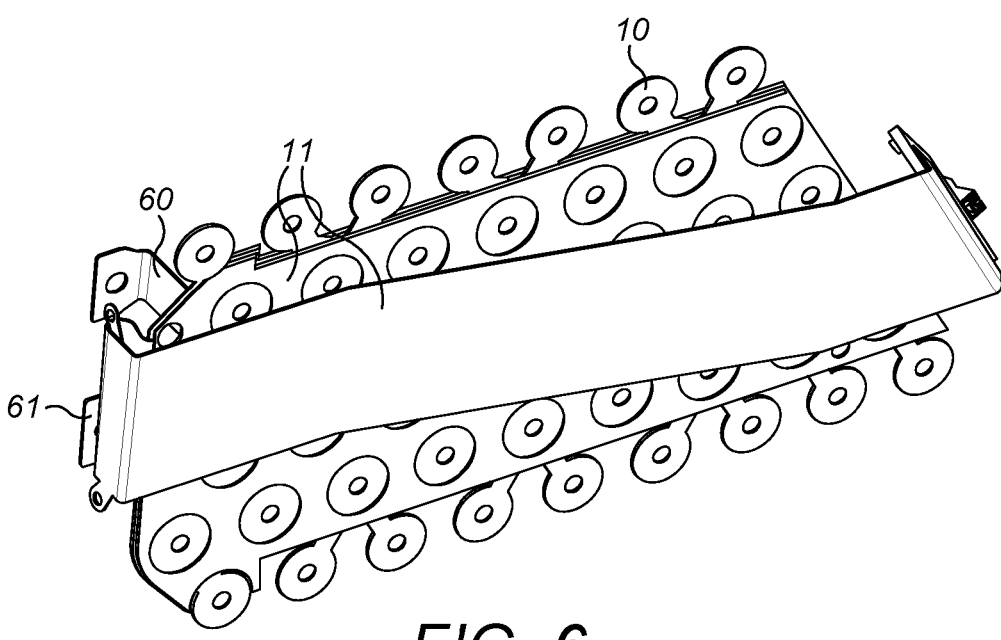
FIG. 6 shows the busbars and flexible printed circuit of a battery module.
FIG. 7 shows the cells, busbars and module terminals of a battery module.

FIG. 7 shows busbars 10 contacting the terminals of multiple cells to form electrical connections between the multiple cells 7. The busbars 10 are formed of electrically conductive material. The busbars 10 may be formed of metal, for example copper or aluminium.

As above, the cell tray 4 (not shown in FIG. 7) fixedly holds cells 7, each cell having a positive terminal and a negative terminal. The busbars 10 may link the cell terminals of any number of cells.

Cells 7 may be arranged in the cell tray 4 so that positive and negative cell terminals protrude from opposite sides of the cell tray. In this way, a current flow path may be created through cells and busbars. For example, the current flow path may "snake" through the battery module. The current flow path may repeatedly intersect the cell tray. The current flow path may repeatedly intersect the longitudinal axis of the battery module. At least some of the cells may be connected in parallel by the busbars 10, meaning that the current flow path passes through multiple cells as the current flow path intersects the cell tray.

Module terminals 13 are shown in FIG. 7. The module terminals 13 are positioned on the back of the battery module and may be integral to the cell tray 4 (not shown in FIG. 7). Module terminals 13 of neighbouring battery modules may be electrically connected, for example, by module to module busbars. The module terminals 13 allow a supply of current to and/or from the cells 7 of the battery module 2.

The busbars 10 may be integrated with a flexible printed circuit board (not shown in FIG. 7). FIG. 6 shows the flexible printed circuit board 11 of a battery module. A portion of the flexible printed circuit board 11 is located in the region enclosed by the module housing and another portion of the flexible printed circuit board 11 is wrapped around the exterior faces of both parts of the two-part module housing 3a, 3b, also shown in FIGS. 2 and 3.

The busbars 10 shown in FIGS. 6 and 7 may be integrated with the flexible printed circuit board 11. The busbars 10 may be configured to conduct a high level of current between the cells of the module and the module terminals 13.

The flexible printed circuit board 11 shown in FIG. 6 may further comprise sense wires. The sense wires may be configured to conduct a low current signal. The sense wires in the flexible printed circuit board may be attached to voltage sensors. Each voltage sensor may be capable of determining the voltage at a point on the busbar. Each voltage sensor may be capable of determining the voltage being drawn from a cell. Each voltage sensor may be capable of inferring the voltage being drawn from a cell from a measurement taken of the voltage being drawn from a busbar 10. Each sense wire in the flexible printed circuit board may be capable of communicating voltage measurements from a voltage sensor to a module control unit 12a, shown in FIG. 1. The module control unit 12a may be capable of adapting the activity of the battery module in response to the voltage measurements provided by the sense wire. Each sense wire may be capable of communicating voltage measurements to the battery control unit. The module control unit 12a may be capable of communicating voltage measurements to the battery control unit. The battery control unit 12, also shown in FIG. 1, may be capable of adapting the activity of the battery module in response to the voltage measurements. The battery control unit 12 may be capable of adapting the activity of the battery in response to the voltage measurements.

The sense wires of the flexible printed circuit board 11 may be attached to one or more temperature sensors. A temperature sensor may be capable of determining the temperature of a part of the battery module. Each sense wire may be capable of communicating temperature measurements from a temperature sensor to the module control unit. The module control unit may be capable of adapting the activity of the battery module in response to the temperature measurements provided by the sense wire. Each sense wire may be capable of communicating temperature measurements to the battery control unit. The module control unit may be capable of communicating temperature measurements to the battery control unit. The battery control unit may be capable of adapting the activity of the battery module in response to the temperature measurements. The battery control unit may be capable of adapting the activity of the battery in response to the temperature measurements.

The sense wires may be attached to other types of sensors, for example current sensors, and/or fluid flow sensors.

FIGS. 6 and 7 also show terminal tabs 60, 61 which each of which connect either a positive or a negative end of the busbar to the respective positive or negative module terminal.

Module Cooling

It is known to supply coolant to regulate the temperature of batteries. In typical batteries, the coolant is confined within coolant jackets or pipes. In such batteries, cells are cooled in areas of the cell which make contact with the jacket or pipe containing the coolant. This is a slow and inefficient cooling method.

In other typical batteries, coolant is not confined by coolant jackets or pipes, but makes direct contact only with the body/centre portion of each cell. In such batteries, the cell terminals are protected so that coolant does not make contact with the cell terminals. Such contact is avoided as it would typically lead to electrical shorting. This is also an inefficient method because the cell terminals, being electrically connected, are often the hottest parts of the cell and yet they are not directly cooled by the coolant.

By contrast, in the battery module described herein, coolant supplied to the battery module 2 makes direct contact with cell terminals, flexible printed circuit board 11, busbars 10, and cell body. The entirety of the cell and connected conducting parts are bathed in coolant. That is, the entirety of the portions of each cell which protrude from the cell tray are configured to be directly contacted by coolant. The coolant used is a dielectric oil. Dielectric oils have insulating properties. Cells drenched in dielectric oil are insulated from one another preventing short circuiting between cells. This is an efficient method of regulating cell temperature. Such efficient cooling enables the cells to operate at a higher power and for longer. This means that fewer and/or smaller cells are required to generate the same power as batteries utilising the previously mentioned cooling methods.

FIG. 3 shows a supply coolant conduit portion 14 and a drain coolant conduit portion 15. In the exemplary configuration shown in FIG. 3, the supply coolant conduit portion 14 is positioned in a lower position and the drain coolant conduit portion 15 is positioned in an upper position. Such a configuration reduces the risk of air locks occurring during filling. Alternatively, the supply coolant conduit portion may be positioned in an upper position and the drain coolant conduit portion may be positioned in a lower position.

In order to fill the battery module with coolant so that components of the module can be bathed in coolant, air is displaced. Each battery module may thus comprise an outlet for allowing air to leave the battery module. The air outlet may be referred to as a bleed port.

Both coolant conduit portions may extend along the battery module in a direction orthogonal to the longitudinal axis of the battery module. Both coolant conduit portions may extend along the battery module in a direction orthogonal to the direction in which the fixing hole 5 extends through the cell tray 4. Both coolant conduit portions may extend along the battery module in a direction parallel to the direction in which the cell holes 6 extend through the cell tray 4.

As shown in FIG. 3, the supply coolant conduit portion 14 is linked to an inlet 16 in the battery module so that coolant may be supplied to a region enclosed by the housing of the battery module. The drain coolant conduit portion 15 is linked to an outlet 17 so that coolant may be drained from a region enclosed by the housing of the battery module. Inlet 16 and outlet 17 are openings formed in the module housing. The inlet may be located in an upper position and the outlet in a lower position. Alternatively, the outlet may be located in an upper position and the inlet in a lower position. The coolant may be supplied to one of the two regions enclosed by the housing and be drained from the other of the two regions enclosed by the housing, one region being on an opposite side of the longitudinal axis of the cell tray to the other region. The cell tray 4 may comprise through-holes 35 to 40 for allowing the passing of coolant from a respective one of the said regions to the other of the said regions. The through-holes may be located in the cell tray 4 at the end of the cell tray 4 remote from the inlet 16 and outlet 17. The through-holes may be shaped to promote even fluid flow over the cells.

As shown in FIG. 1, battery 1 contains a number of battery modules 2 arranged in a row. When battery modules 2 are positioned in a row, a coolant conduit portion 14 of one battery module aligns with a coolant conduit portion of a neighbouring battery module. The two coolant conduit portions may be connected to one another by a coupler 19, shown in FIG. 3. Couplers 19 form liquid tight connections between coolant conduit portions so that coolant may flow from portion to portion. When supply coolant conduit portions 14 of the battery modules in the row of battery modules are connected by couplers 19, they form a supply coolant conduit 14a which extends along the length of the row of battery modules. When drain coolant conduit portions 14 of the battery modules in the row of battery modules are connected by couplers 19, they form a drain coolant conduit 15a which extends along the length of the row of battery modules. Alternatively, according to other examples, adjacent coolant conduit portions may be integral to one another such that couplers joining portions are not required. Multiple coolant conduit portions may form longer conduits which once installed cannot be split into conduit portions. A row of battery modules 2 may comprise a supply coolant conduit which extends along the length of the row of battery modules and is not divided into individual portions. A row of battery modules 2 may comprise a drain coolant conduit which extends along the length of the row of battery modules and is not divided into individual portions.

As shown in FIG. 1, the longitudinal axes of all the battery modules 2 in the row of battery modules of the battery 1, may be parallel to one another. Both coolant conduits 14a, 15a may extend along the row of battery modules in a direction orthogonal to the longitudinal axes of the battery modules in the row of battery modules. Both coolant conduits may extend along the row of battery modules in a direction orthogonal to the direction in which the fixing hole 5 extends through the cell tray 4 of each battery module. Both coolant conduits may extend along the row of battery modules in a direction parallel to the direction in which the cell holes 6 extend through the cell tray 4 of each battery module.

Inlet 16 and outlet 17 may be configured to allow coolant to enter and leave the battery module 2. Inlet 16 and outlet 17 may further act as passages through which the flexible printed circuit boards 11 pass between the interior and exterior of the battery module, as shown in FIG. 3. The inlet 16 and outlet 17 may be the only openings in the two-part housing 3a, 3b of the battery module 2. Alternatively, the battery module may comprise other inlets and outlets, for example a bleed port used to allow air to leave the battery module. FIG. 3 shows sealant 18 around the inlet 16 and outlet 17. Sealant 18 ensures that coolant inside the battery module does not leak from the battery module into other parts of the battery.

The method of direct cell cooling described herein also has further advantages in the case that excessive pressure builds up inside a cell. Each cell may comprise a cell vent port. In the case that excessive pressure builds up inside the cell, the cell vent port may be activated, allowing fluids within the cell to escape the cell. The cell vent port may be configured to expel cell fluids in the event that pressure within the cell exceeds a threshold. Upon leaving the cell, the fluids are quenched by the surrounding coolant.

Battery Cooling

A battery of a modular design is beneficial in that battery modules can be arranged in a variety of configurations to enable the battery to fit into cavities of different dimensions and shapes. Hence the same manufactured parts can be used in a wide range of applications.

Figure 8:
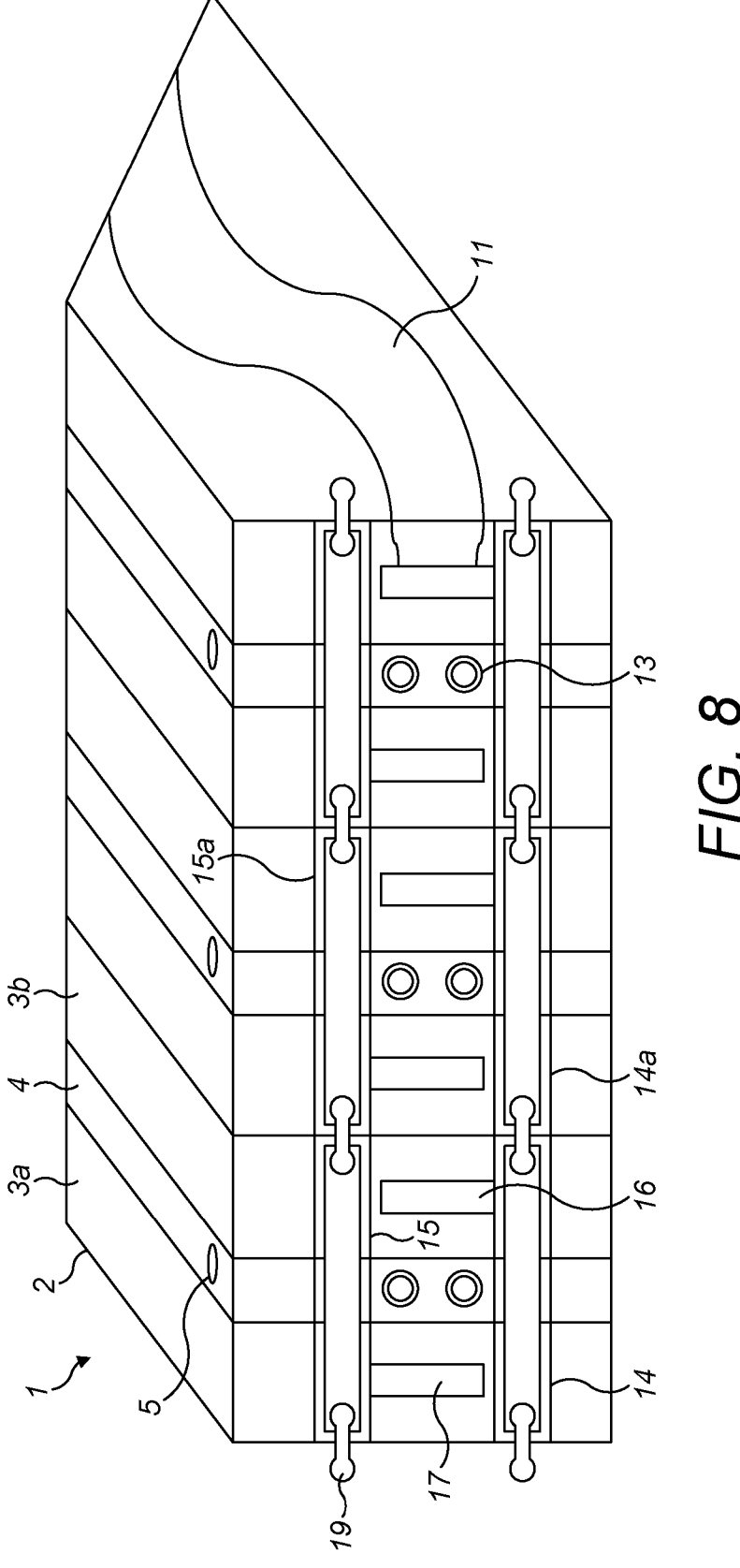
FIG. 8 shows battery modules arranged in a row.
Figure 9:
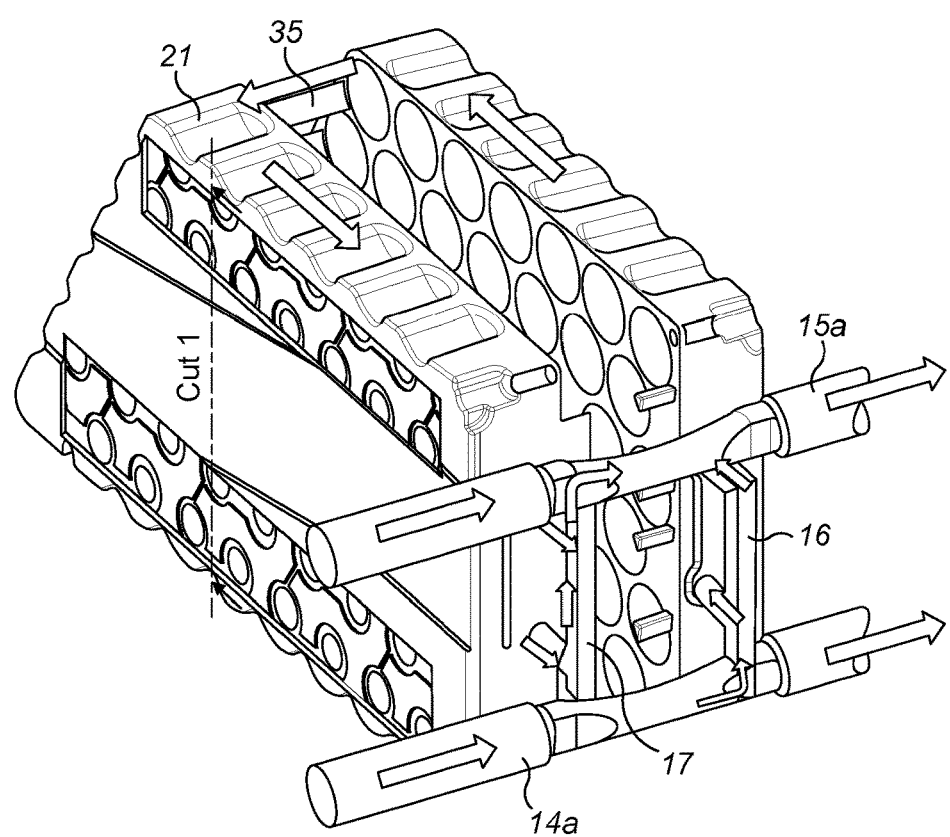
FIG. 9 shows coolant flow in a battery module.
Figure 10:
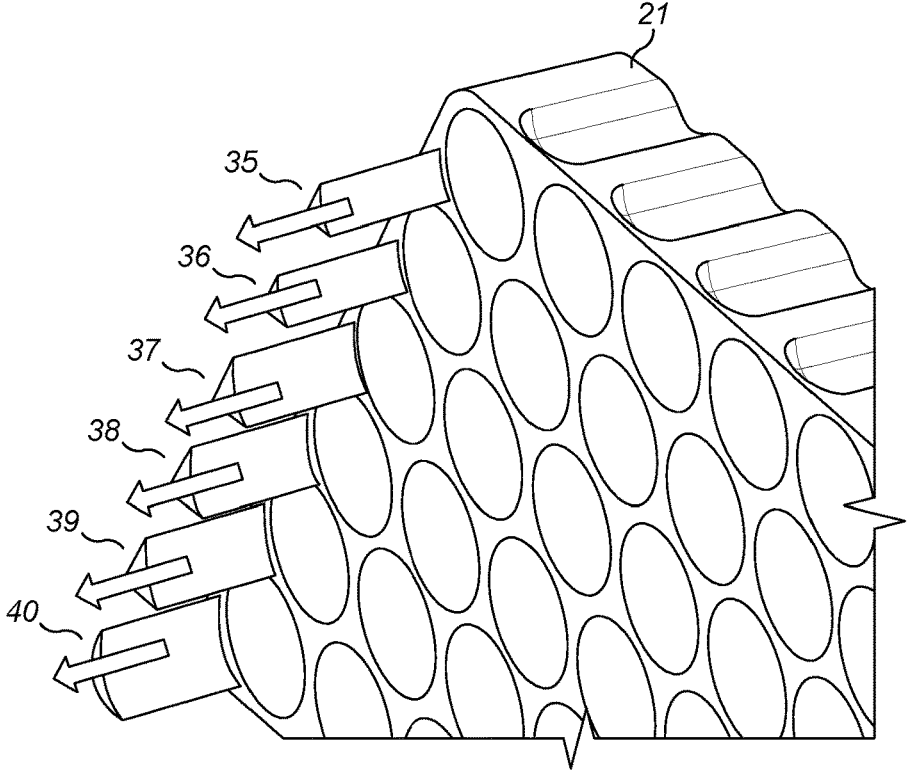
FIG. 10 shows coolant flow through the cell tray of a battery module.

FIG. 8 shows a number of battery modules 2 arranged in a row. FIG. 8 shows a supply coolant conduit 14a and a drain coolant conduit 15a extending along the length of the row of battery modules. There may be any number of battery modules in the row. FIG. 8 shows supply coolant conduit 14a comprising supply coolant conduit portions 14 and couplers 19. The couplers may push fit into the respective coolant conduits portions or may, alternatively or additionally, be welded, glues or otherwise fixed into the conduits portions to provide a fluid tight seal. It is preferable that the fixing mechanism is easily reversible to allow for reconfiguration of the modules and/or maintenance. FIG. 8 also shows drain coolant conduit 15a comprising drain coolant conduit portions 15 and couplers 19. Coolant from the supply coolant conduit 14a enters each battery module 2 through the inlet 16. Coolant circulates through the battery module as shown in FIGS. 9 and 10 and is drained from each battery module 2 through the outlet 17 into the drain coolant conduit 15a.

Depending on the vehicle cavity into which the battery is to be installed, the battery modules may be arranged differently. The battery may comprise a single row of battery modules. The battery may comprise multiple rows of battery modules. For example, if the cavity in the vehicle is generally a cuboid shape, multiple rows of battery modules may be installed, wherein each row would comprise its own supply coolant conduit and its own drain coolant conduit. A battery having a cuboid shape may achieved by tessellating battery modules.

Each row of battery modules may be configured to functionally interact with its own heat exchanger. Alternatively, multiple rows of battery modules may be configured to interact with one heat exchanger.

The battery may comprise battery modules in any arrangement

Each battery module may be configured so that coolant supplied to the battery module through the inlet enters an enclosed region containing cells so that the coolant makes direct contact with cells held in cell tray 4. The coolant may make direct contact with terminals of the cells.

Alternatively, the coolant may be supplied to a region that doesn't contain cells and accordingly cools the cells indirectly.

According to one example, the battery comprises battery modules, each battery module contains a cell tray, the cell tray having a longitudinal axis. The cell tray further comprises a fixing hole and cell holes, the cell holes extending through the cell tray in a direction orthogonal to the longitudinal axis. Each cell inserted into a cell hole in the cell tray has a positive terminal at an end of the cell and a negative terminal at an opposite end of the cell. Each cell inserted into a cell hole has a length longer than the length of the cell hole and is held in the cell tray in a position so that the cell's positive terminal protrudes from one end of the cell hole and the cell's negative terminal protrudes from an opposite of the cell hole. The end of the cell comprising the positive terminal and the end of the cell comprising the negative terminal may protrude from the cell by equal lengths.

In this example, the housing is a two-part housing, one part 3a enclosing a first region of the battery module containing all cell terminals protruding from a face of the cell tray and the other part 3b enclosing a second region of the battery module containing all cell terminals protruding from an opposite face of the cell tray. There may be positive cell terminals and negative cell terminals protruding from both faces of the cell tray. The cell tray may form a partition in the battery module, separating the first and second regions.

In these examples, each cell tray may further comprise through-holes through which coolant may pass from one enclosed region to an adjacent enclosed region.

FIG. 9 shows coolant 21 within components of a battery module. The figure depicts only coolant within components, not components themselves. Arrows depict the flow path of the coolant 21. Coolant 21 is supplied to the battery module from supply coolant conduit 14a through inlet 16. Coolant flows through one enclosed region of the battery module, bathing cells (not shown) in coolant. Coolant then passes through the cell tray via through holes 35-40, shown in FIG. 10, into a second enclosed region of the battery module. Finally, coolant is drained from the battery module through outlet 17 into drain coolant conduit 15a.

This process typically occurs continuously in all battery modules in the row of battery modules in the battery.

This invention relates to a battery of a modular design, the battery comprising coolant conduits, wherein the coolant conduits are also of a modular design. This invention has the advantage that manufactured modular battery parts are highly configurable and may be used in a wide variety of battery applications. This invention removes the need for different designs of coolant conduits to be manufactured for use with batteries to be installed in different types of vehicles.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A battery comprising:

a plurality of battery modules arranged in a row, each battery module comprising a plurality of cells and a housing enclosing the plurality of cells; and a supply coolant conduit and a drain coolant conduit, each adjoining and extending along at least part of the row of battery modules, the supply coolant conduit being configured to supply coolant to multiple ones of the battery modules and the drain coolant conduit being configured to drain coolant from multiple ones of the battery modules, wherein the supply coolant conduit comprises:

a plurality of supply coolant conduit portions, each supply coolant conduit portion adjoining a respective one of the battery modules; and couplers, each coupler connecting pairs of adjacent supply coolant conduit portions; and wherein the drain coolant conduit comprises:

a plurality of drain coolant conduit portions, each drain coolant conduit portion adjoining a respective one of the battery modules; and couplers, each coupler connecting pairs of adjacent drain coolant conduit portions;

wherein, for each battery module in the plurality of battery modules, a supply coolant conduit portion adjoins a face of the battery module and a drain coolant conduit portion adjoins the face of the battery module, the supply coolant conduit portion being configured to supply coolant to the battery module and the drain coolant conduit portion being configured to drain coolant from the battery module; and the plurality of cells in each battery module are configured to be directly contacted by coolant supplied to the battery module.

2. The battery of claim 1, wherein the battery is configured so that coolant supplied by the supply coolant conduit to a battery module of the plurality of battery modules is supplied to a region of the battery module enclosed by the housing of the battery module and is drained by the drain coolant conduit from the region of the battery module enclosed by the housing of the battery module.

3. The battery of claim 1, the battery being configured to functionally interact with a heat exchanger for extracting thermal energy from the coolant.

4. The battery of claim 3, the battery being configured so that coolant drained by the drain coolant conduit from any of the ones of the battery modules is acted upon by the heat exchanger prior to being supplied to the respective battery modules.

5. The battery of claim 1, wherein the couplers are configured to form press-fit liquid-tight connections between supply coolant conduit portions or between drain coolant conduit portions.

6. The battery of claim 1, wherein each battery module further comprises a cell tray defining a plurality of cell holes and the plurality of cells in each battery module are in the cell holes in the respective cell tray.

7. The battery of claim 1, wherein each supply coolant conduit and each drain coolant conduit are disposed about a central axis, the central axis being a straight line.

8. A vehicle comprising the battery of claim 1, wherein the vehicle is configured to be driven by means of the battery.

9. The battery of claim 2, wherein the battery is configured to functionally interact with a heat exchanger for extracting thermal energy from the coolant.

10. The battery of claim 2, wherein each battery module further comprises a cell tray defining a plurality of cell holes and the plurality of cells in each battery module are in the cell holes in the respective cell tray.

11. The battery of claim 4, wherein each battery module further comprises a cell tray defining a plurality of cell holes and the plurality of cells in each battery module are in the cell holes in the respective cell tray.

12. The battery of claim 5, wherein each battery module further comprises a cell tray defining a plurality of cell holes and the plurality of cells in each battery module are in the cell holes in the respective cell tray.

13. The battery of claim 2, wherein each supply coolant conduit and each drain coolant conduit are disposed about a central axis, the central axis being a straight line.

14. The battery of claim 4, wherein each supply coolant conduit and each drain coolant conduit are disposed about a central axis, the central axis being a straight line.

15. The battery of claim 5, wherein each supply coolant conduit and each drain coolant conduit are disposed about a central axis, the central axis being a straight line.

16. The battery of claim 6, wherein each supply coolant conduit and each drain coolant conduit are disposed about a central axis, the central axis being a straight line.

17. A vehicle comprising the battery of claim 4, wherein the vehicle is configured to be driven by means of the battery.

* * * * *